Feb. 9, 1926. 1,572,166
E. A. SMITH
TOY AIRPLANE
Filed July 25, 1925   3 Sheets-Sheet 1
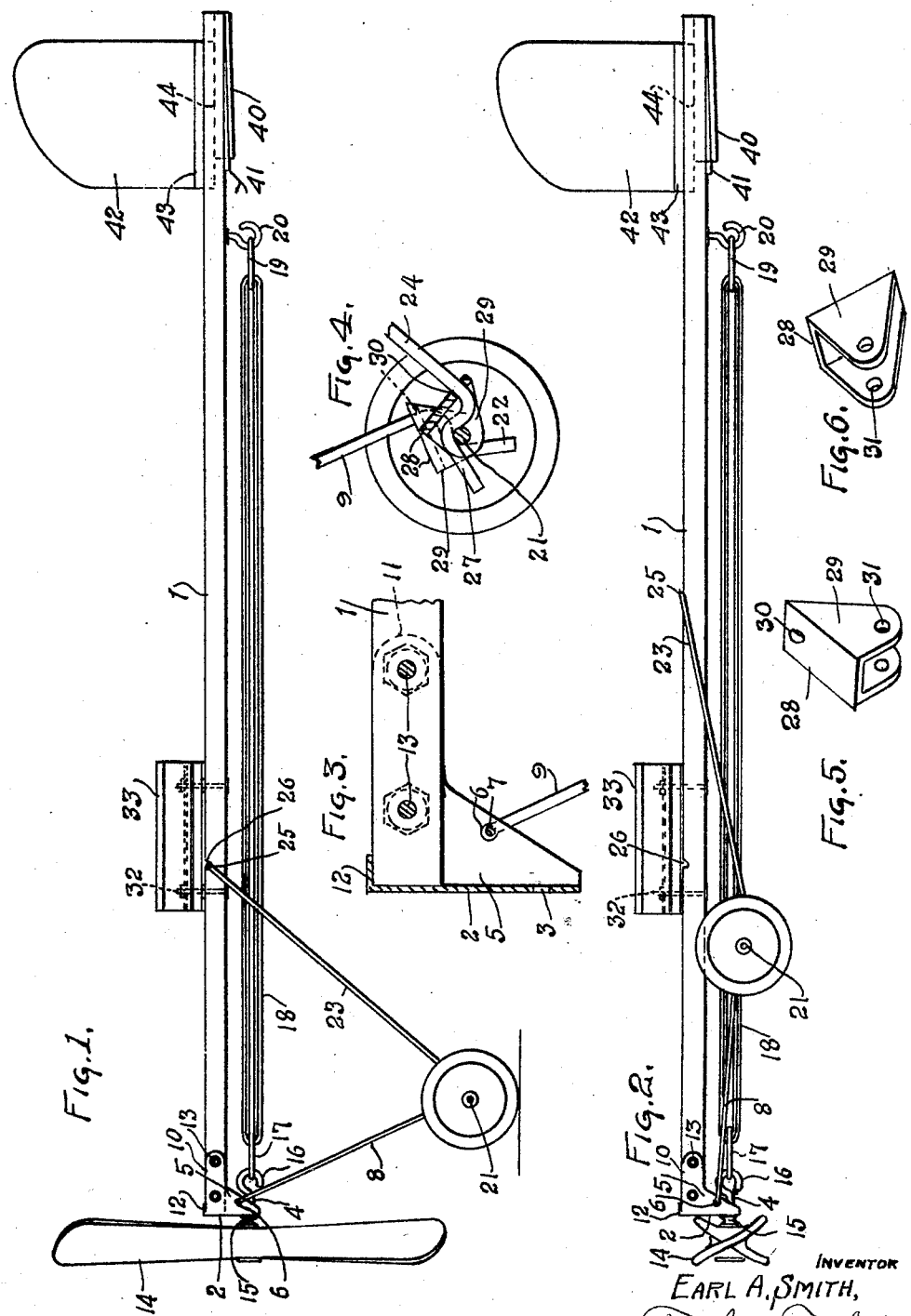

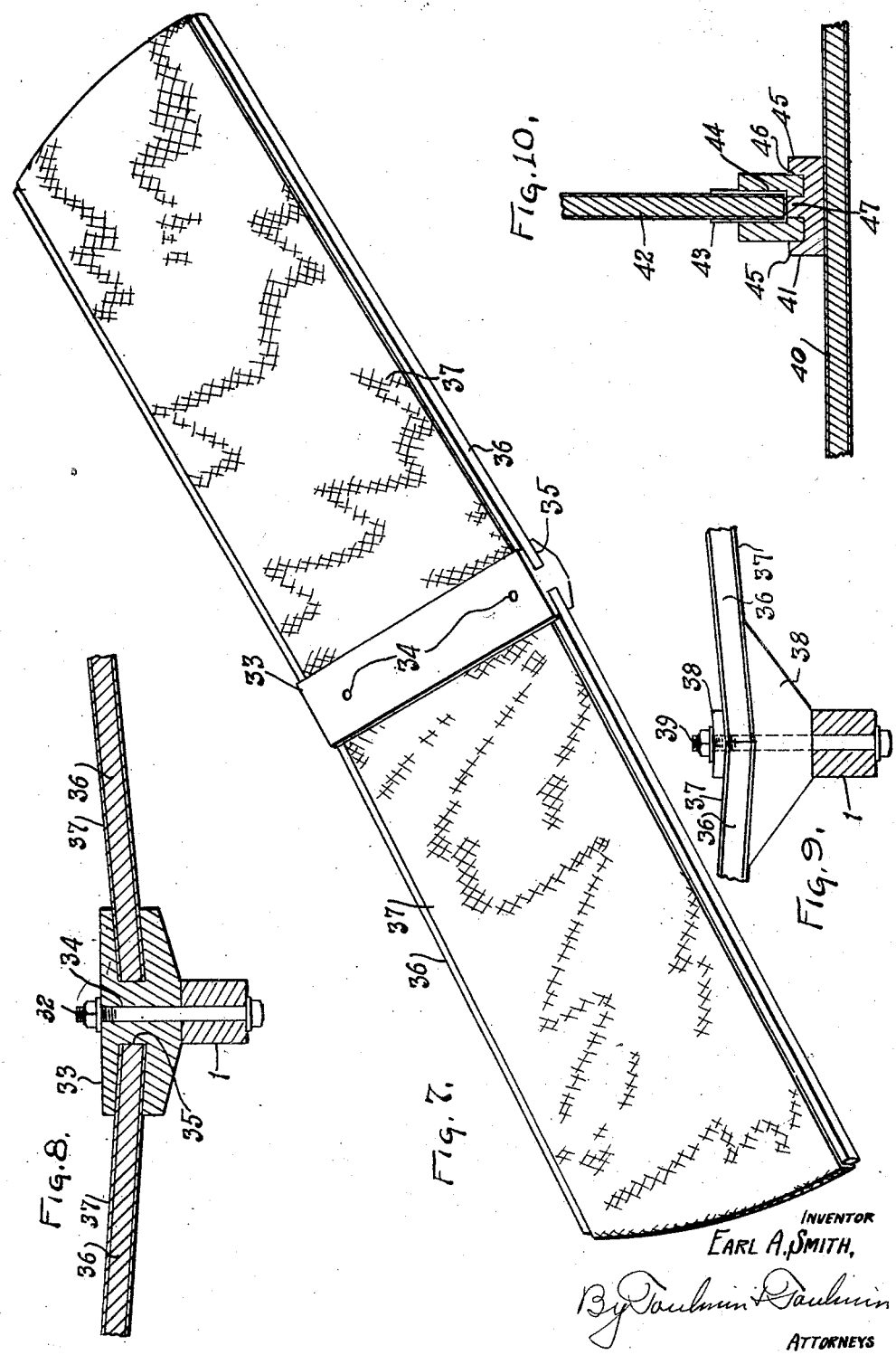

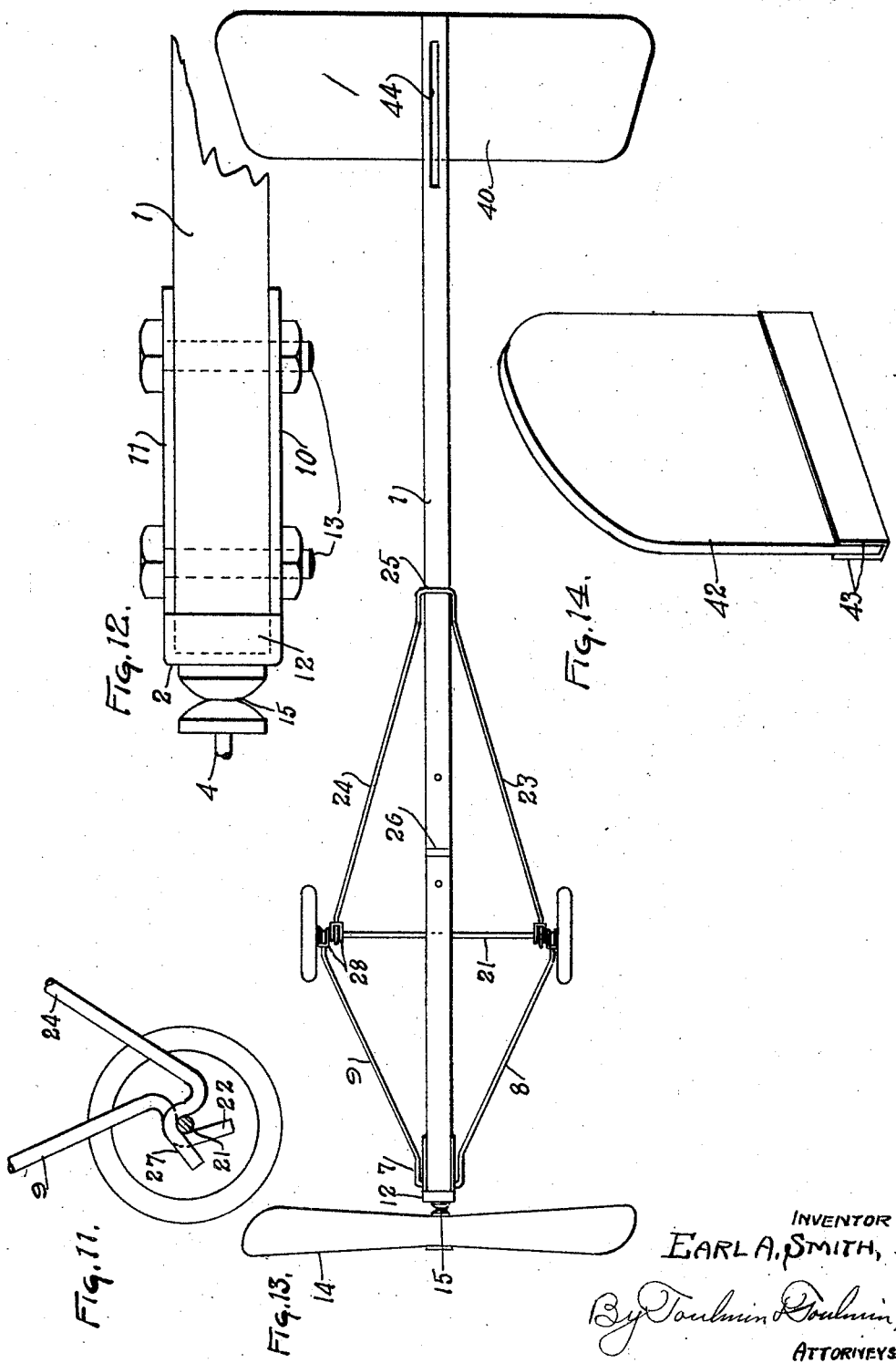

Patented Feb. 9, 1926.

1,572,166

UNITED STATES PATENT OFFICE.

EARL A. SMITH, OF DAYTON, OHIO, ASSIGNOR TO SMITH AND DWYER MANUFACTURING COMPANY, A COPARTNERSHIP COMPOSED OF EARL A. SMITH AND DANIEL I. DWYER, OF DAYTON, OHIO.

TOY AIRPLANE.

Application filed July 25, 1925. Serial No. 46,005.

*To all whom it may concern:*

Be it known that I, EARL A. SMITH, a citizen of the United States, residing at Dayton, in the county of Montgomery and State of Ohio, have invented certain new and useful Improvements in Toy Airplanes, of which the following is a specification, reference being had therein to the accompanying drawing.

My invention relates to airplanes.

It is the object of my invention to provide a collapsible and easily assembled and disassembled airplane.

In particular it is my object to provide a toy airplane which can be so collapsed and disassembled that it may be readily packed in a carton for shipment in a small space and can be readily assembled by children without special tools. It is also my object to provide such a plane which is strong, durable, capable of withstanding considerable rough treatment and shock due to landing after flight.

It is my object to provide features which are applicable, however, to full-sized airplanes, such as a retractable landing gear.

Referring to the drawings:

Figure 1 is a side elevation of the airplane completely assembled;

Figure 2 is a side elevation of the plane with the landing gear retracted;

Figure 3 is a detail view in section of the forward propeller and landing gear strut support;

Figure 4 is a section through the landing gear fitting and axle showing the form of connection of the landing gear struts to the axle;

Figure 5 is a perspective of one of the fittings of the landing gear struts to the axle;

Figure 6 is a perspective of its companion fitting;

Figure 7 is a perspective of the wing unit;

Fig. 8 is a section on the line 8—8 of Figure 7;

Figure 9 is an elevation of a modified form of attachment of the wings to the fuselage member which is in section;

Figure 10 is a section on the line 10—10 of Figure 1 showing the arrangement for attaching the rudder and the stabilizer surface to the fuselage;

Figure 11 is a detail view of the mounting of the landing gear struts on the axle with the fittings removed for the purpose of clearness;

Figure 12 is a detail view of the front end of the fuselage showing the forward propeller and landing gear strut fitting and its method of attachment to the fuselage;

Figure 13 is a plan view of the plane with the wings removed and the landing gear in retracted position and with the rudder removed;

Figure 14 is a perspective of the rudder structure with the glued strip before inserting in the fuselage member.

Referring to the drawings in detail, 1 is a fuselage member having at its forward end a fitting consisting of an end plate 2 which has an aperture 3 for supporting the propeller shaft 4. It is provided with triangular side plates or braces 5 and apertures 6 for receiving pivotally the upper forward end of the V-shaped landing gear strut comprising the cross piece 7 and struts 8 and 9. This permits the forward strut structure to rock at this point but the triangular braces 5 give sufficient strength to prevent the fitting from breaking. The fitting is provided with side pieces 10 and 11 and a cap piece 12. The side pieces are held by bolts 13 to the fuselage member 1.

14 designates the propeller mounted on the propeller shaft 4 having the bearings 15 and an eye 16 in which is hooked the link 17 carrying the rubber bands 18. These bands are looped over a link 19 at the other end of the fuselage carried by the screw eye 20.

The landing gear struts 8 and 9 are provided at their lower ends with a forwardly extending V-shaped bent portion to receive the axle 21. This V-shaped bent portion or hook is designated 22.

The rear strut structure consisting of the struts 23 and 24 connected by the member 25 which normally rests in the slot 26 on the fuselage member has at its lower ends similar hooks 27. These hooks are held in position by the clips or fittings shown in Figures 5 and 6 which consist of a plate portion 28 to receive the lower end of the strut while the hook portion is within the side walls 29 of a fitting. The strut passes through the opening 30 in the plate 28 while the axle passes through the openings 31 in the side plates 29. Thus the hook is closed and held on the axle.

It will be noted that the hooks on the ends of the respective struts are oppositely disposed so that there is a firm and positive mounting of the struts on the axle.

When it is desired to retract the landing gear the cross member 25 is lifted out of the slot 26 and moved backwardly on the fuselage member thus drawing up the landing gear. When the landing gear strut is in its foremost extended position it is held in that position by the wing structure being bolted over it on the fuselage member. Bolts 32 are mounted in the fuselage member adapted to receive the central rib 33 having apertures 34 through which the bolts are inserted. This rib is slotted as at 35 to receive the wings 36 having the strips of reinforcing fabric covering 37.

A modified form of this device will be seen in Figure 9 where the fuselage member 1 has glued to the top thereof a member with outwardly, triangular shaped spreading arms 38 to which are glued the wings 36. A plate 38 is glued on top of the wings at their juncture. A bolt or bolts 39 are inserted through the several parts to hold them together.

Turning to the end of the fuselage structure it will be observed is a stabilizer surface 40 which has a negative angle of incidence due to the wedge 41. The rudder 42 which has a glued strip 43 is inserted in the slot 44 in the upper surface of the fuselage member. To assemble, the rudder which has a strip of canvas, linen, silk or paper glued to it has the strip moistened and then inserted in the slot in which it fits tightly, thus making a more or less permanent fit.

A modified form of this structure will be seen in Figure 10 where the wedge member 41 has side ledges 45, grooves 46 and a central rib 47. The slot 44 is extended through the fuselage member 1 so that the rib 47 can project into it, and the ribs 45 on either side can embrace the sides of the fuselage member 1. By gluing the several parts together this makes a structure which is rigid but easily positioned in assembly.

It will be understood that I desire to comprehend within my invention such modifications as may be necessary to adapt it to varying conditions and uses.

Having thus fully described my invention, what I claim as new and desire to secure by Letters Patent, is:

1. In an airplane having a fuselage, wings, propeller and rudder, a retractable landing gear consisting of landing gear struts pivotally mounted to the landing gear axle and a portion of the struts pivotally mounted to the fuselage and another portion detachably mounted on the fuselage, said wing members being detachably mounted over the detachably fixed ends of the struts to hold them in position.

2. In an airplane having a fuselage, wings, propeller and rudder, a retractable landing gear consisting of landing gear struts pivotally mounted to the landing gear axle and a portion of the struts pivotally mounted to the fuselage and another portion detachably mounted on the fuselage, said wing members being detachably mounted over the detachably fixed ends of the struts to hold them in position, said fuselage member having a notch for receiving the ends of the struts at the point of their detachable attachment to the fuselage.

3. In an airplane, a fuselage member, a fitting at one end, landing gear struts pivoted thereto and to a landing gear axle having wheels, a second pair of struts pivotally mounted on the axle at one end and detachably mounted on the fuselage at the other, said fitting having triangular shaped side portions for reinforcing the portion supporting the landing gear struts pivotally.

4. In an airplane, a fuselage member, means of pivotally mounting a landing gear strut at one end and at the other end pivotally mounting said landing gear strut on a second strut, a second strut, the other end of which is detachably mounted on said fuselage, and a wing structure adapted to be detachably mounted over said last-mentioned end of the strut to hold it in position on the fuselage.

5. In an airplane, a fuselage member, means of pivotally mounting a landing gear strut at one end thereon and the other end pivotally mounting the landing gear strut on a second strut, a second strut, the other end of which is detachably mounted on said fuselage, and a wing structure adapted to be detachably mounted over said last-mentioned end of the strut to hold it in position on the fuselage, said forward end of the first-mentioned strut being pivotally mounted in a fitting detachably mounted on the end of the fuselage, said fitting being adapted to support a propeller shaft.

6. In an airplane, a fuselage member, a landing gear strut pivotally mounted on the forward end thereof and provided with a hook end at the lower end for mounting on an axle, an axle and wheels, a second landing gear strut pivotally mounted on said axle having a hooked end, the other end of said strut being detachably mounted on the fuselage.

7. In an airplane, a fuselage member, a landing gear strut pivotally mounted on the forward end thereof and provided with a hook end at the lower end for mounting on an axle, an axle and wheels, a second landing gear strut pivotally mounted on said axle having a hooked end, the other end of said strut being detachably mounted on the fuselage, and clips mounted on said axle through a portion of which the struts project for retaining said hooked ends on the axle.

8. In an airplane, a fuselage, a forward landing gear strut and a rear landing gear strut, the lower ends of which are formed in hooks, clips through which said struts are projected, the hooks being within the clips on the axle, said axle being projected through the side walls of the clips.

9. In a knock-down airplane structure, a fuselage member, a retractable landing gear pivoted to the fuselage at one end and detachably mounted on the fuselage at the other, a propeller, a detachable wing structure and a detachable rudder structure, said detachable rudder structure consisting of a rudder member having a glued portion adapted to be inserted in a slot in the fuselage member, and a stabilizer member mounted on a wedge-shaped member beneath the fuselage having a rib adapted to be projected into said slot in the fuselage.

10. In a knock-down airplane structure, a fuselage member, a retractable landing gear pivoted to the fuselage at one end and detachably mounted on the fuselage at the other, a propeller, a detachable wing structure and a detachable rudder structure, said detachable rudder structure consisting of a rudder member having a glued portion adapted to be inserted in a slot in the fuselage member, and a stabilizer member mounted on a wedge-shaped member beneath the fuselage having a rib adapted to be projected into said slot in the fuselage, and positioning members on either side of said wedge for engaging the sides of the fuselage member.

11. In an airplane having a fuselage member, landing gear, propeller, rudder and stabilizer, a wing supporting member with upwardly and outwardly extending arms mounted on the fuselage member for determining the angularity of the wings, wings adapted to be mounted thereon with their ends adjacent to one another, a cap plate over the wing juncture and means passing through said cap plate, wings, wing support and fuselage member for detachably attaching them together.

12. In an airplane having a fuselage member, landing gear, propeller, rudder and stabilizer, a wing supporting member with upwardly and outwardly extending arms mounted on the fuselage member for determining the angularity of the wings, wings adapted to be mounted thereon with their ends adjacent to one another, a cap plate over the wing juncture and means passing through said cap plate, wings, wing support and fuselage member for detachably attaching them together, said several parts being glued together.

In testimony whereof I affix my signature.

EARL A. SMITH.